United States Patent
Dolan (10) Patent No.: US 10,443,758 B2
(45) Date of Patent: Oct. 15, 2019

(54) SYSTEMS AND METHODS FOR ELECTROHYDRAULIC VALVE CALIBRATION

(71) Applicant: HUSCO INTERNATIONAL, INC., Waukesha, WI (US)

(72) Inventor: Tim Dolan, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 145 days.

(21) Appl. No.: 15/452,261

(22) Filed: Mar. 7, 2017

(65) Prior Publication Data

US 2017/0261123 A1  Sep. 14, 2017

Related U.S. Application Data

(60) Provisional application No. 62/305,315, filed on Mar. 8, 2016.

(51) Int. Cl.
| | |
|---|---|
| *F16K 37/00* | (2006.01) |
| *F16K 31/42* | (2006.01) |
| *F15B 19/00* | (2006.01) |

(52) U.S. Cl.
CPC ........ *F16K 37/0041* (2013.01); *F15B 19/002* (2013.01); *F16K 31/42* (2013.01); *F16K 31/426* (2013.01); *F16K 37/0091* (2013.01); *F15B 2211/20576* (2013.01); *F15B 2211/30565* (2013.01); *F15B 2211/327* (2013.01); *F15B 2211/40507* (2013.01); *F15B 2211/40515* (2013.01); *F15B 2211/61* (2013.01); *F15B 2211/611* (2013.01); *F15B 2211/6306* (2013.01); *F15B 2211/6309* (2013.01)

(58) Field of Classification Search
CPC .... F16K 37/0041; F16K 31/43; F16K 41/426; F16K 37/0091; F15B 19/002
See application file for complete search history.

(56) References Cited

U.S. PATENT DOCUMENTS

| | | | |
|---|---|---|---|
| 6,341,552 B1* | 1/2002 | Potter | F15B 19/002 91/433 |
| 6,357,276 B1* | 3/2002 | Koehler | F15B 11/006 73/1.01 |
| 6,397,655 B1 | 6/2002 | Stephenson | |
| 7,997,117 B2 | 8/2011 | Zhang et al. | |
| 9,279,736 B2 | 3/2016 | Hughes et al. | |
| 9,568,119 B2 | 2/2017 | Janson et al. | |
| 2017/0262001 A1* | 9/2017 | Pfaff | F16K 37/005 |

* cited by examiner

*Primary Examiner* — David Z Huang
(74) *Attorney, Agent, or Firm* — Quarles & Brady LLP (57) ABSTRACT

Systems and methods for electrohydraulic valve calibration are provided. In one aspect, a calibration circuit includes a calibration conduit isolated from a supply conduit, a first calibration orifice configured to provide fluid communication between the calibration conduit and a fluid source, and a second calibration orifice arranged in series with the first calibration orifice. The second calibration orifice is on a spool of a electrohydraulic control valve and is configured to selectively provide fluid communication between the calibration conduit and a low pressure source. The calibration circuit further includes a pressure sensor configured to measure a pressure in the calibration conduit between the first calibration orifice and the second calibration orifice. The second calibration orifice is isolated from the at least one workport of the electrohydraulic control valve.

25 Claims, 5 Drawing Sheets

SYSTEMS AND METHODS FOR ELECTROHYDRAULIC VALVE CALIBRATION

CROSS-REFERENCES TO RELATED APPLICATIONS

The present application is based on, claims priority to, and incorporates herein by reference in its entirety, U.S. Provisional Patent Application No. 62/305,315, filed on Mar. 8, 2016, and entitled "Valve Calibration Core for Spool Position vs. Command."

STATEMENT REGARDING FEDERALLY SPONSORED RESEARCH

Not Applicable.

BACKGROUND

The present disclosure relates generally to hydraulic systems for use on mobile machinery and, more specifically, to systems and methods for electrohydraulic valve calibration.

Electrohydraulic valves may be implemented in hydraulic systems on mobile machinery to provide a variety of fluid flow control functions based on an electrical input from a controller. For example, electrohydraulic valves may be used to direct pressurized fluid to a function on the mobile machine, provide fluid communication between a function on the mobile machine and a reservoir, and/or regulate a fluid pressure. Typically in hydraulic systems with electrohydraulic valves, it is common to require a calibration in an attempt to remove the impact of component tolerances from the performance of the overall system.

SUMMARY OF THE INVENTION

The present disclosure provides systems and methods for electrohydraulic valve calibration. In one aspect, the present disclosure provides a calibration circuit operable to calibrate an electrohydraulic control valve in a hydraulic system. The hydraulic system includes a pump configured to supply fluid into a supply conduit and at least one function. The electrohydraulic control valve includes at least one workport in fluid communication with the at least one function. The calibration circuit includes a calibration conduit isolated from the supply conduit, a first calibration orifice configured to provide fluid communication between the calibration conduit and a fluid source, and a second calibration orifice arranged in series with the first calibration orifice. The second calibration orifice is on a spool of the electrohydraulic control valve and is configured to selectively provide fluid communication between the calibration conduit and a low pressure source. The calibration circuit further includes a pressure sensor configured to measure a pressure in the calibration conduit between the first calibration orifice and the second calibration orifice. The second calibration orifice is isolated from the at least one workport of the electrohydraulic control valve.

In one aspect, the present disclosure provides a hydraulic system operable to calibrate an electrohydraulic control valve. The hydraulic system includes a pump configured to supply fluid into a supply conduit, at least one function, an electrohydraulic control valve having at least one workport in fluid communication with the at least one function, a calibration supply conduit configured to receive a flow of fluid from a calibration source, and a calibration conduit. The hydraulic system further includes a first calibration orifice configured to provide fluid communication between the calibration supply conduit and the calibration conduit, and a second calibration orifice arranged in series with the first calibration orifice. The second calibration orifice is on a spool of the electrohydraulic valve and is configured to selectively provide fluid communication between the calibration conduit and a low pressure source. The hydraulic system further includes a pressure sensor configured to measure a pressure in the calibration conduit between the first calibration orifice and the second calibration orifice. The calibration conduit and the second calibration orifice are isolated from the at least one function.

In one aspect, the present disclosure provides a method for calibrating an electrohydraulic control valve in a hydraulic system. The hydraulic system including a pump configured to supply fluid into a supply conduit and at least one function. The electrohydraulic control valve includes at least one workport in fluid communication with the at least one function. The method includes providing a flow of fluid into a calibration conduit through a first calibration orifice. The calibration conduit is isolated from the supply conduit. The method further includes commanding the electrohydraulic control valve to provide fluid communication from the calibration conduit to a low pressure source through a second calibration orifice. The second calibration orifice is arranged on a spool of the electrohydraulic control valve and isolated from the at least one function. The method further includes monitoring a pressure in the calibration conduit as the electrohydraulic control valve is commanded, determining when the pressure in the calibration conduit transitions a predetermined pressure value, recording the command applied to the electrohydraulic control valve when the pressure in the calibration conduit transitions the predetermined pressure value, calibrating a position of the electrohydraulic control valve to the command applied thereto.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

The use of the terms "downstream" and "upstream" herein are terms that indicate direction relative to the flow of a fluid. The term "downstream" corresponds to the direction of fluid flow, while the term "upstream" refers to the direction opposite or against the direction of fluid flow.

Figure 1:
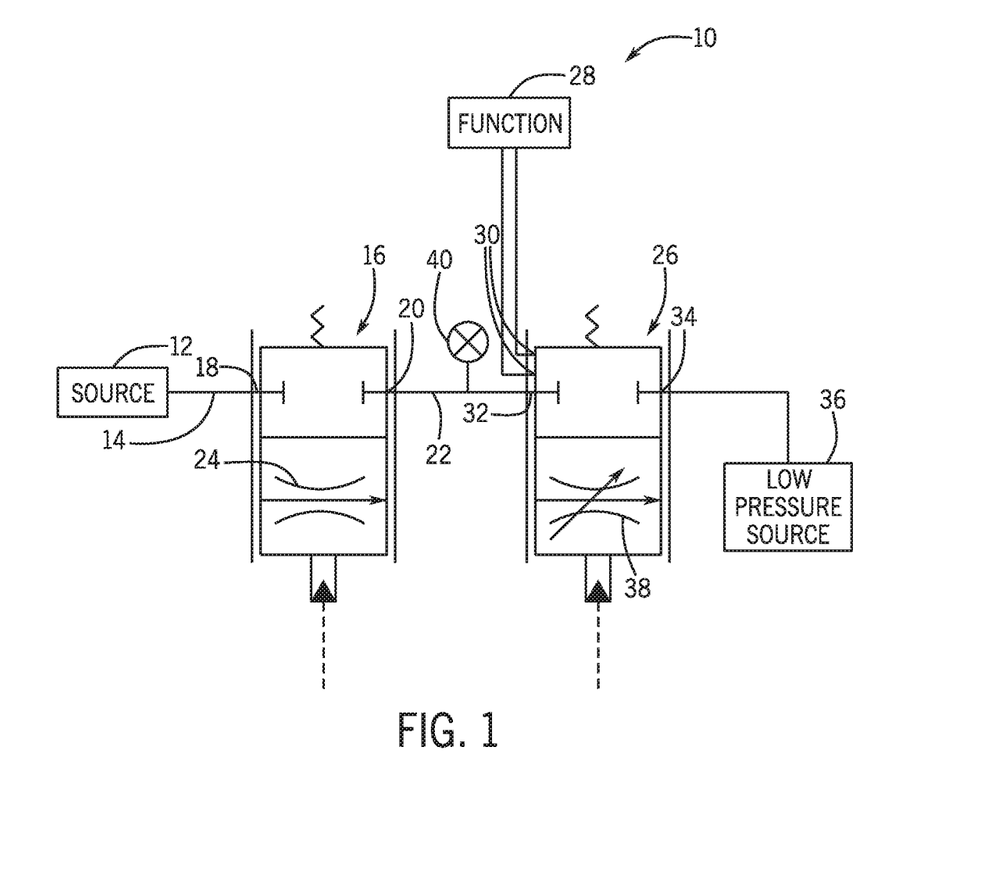
FIG. 1 is a schematic illustration of a calibration circuit operable to perform a calibration of an electrohydraulic valve according to one aspect of the present disclosure.

FIG. 1 illustrates one non-limiting example of a calibration circuit 10 operable to perform a calibration of one or more electrohydraulic control valves according to one aspect of the present disclosure. The calibration circuit 10 can include a fluid source 12 in fluid communication with and configured to supply pressurized fluid to a calibration supply conduit 14. A valve 16 can be arranged on the calibration supply conduit 14 downstream of the fluid source 12 and can be selectively moveable between at least two positions and include at least two ports 18 and 20. In a valve first position, the valve 16 can be configured to inhibit fluid communication between the at least two ports 18 and 20. In a valve second position, the valve 16 can be configured to provide fluid communication between the at least two ports 18 and 20 to connect the calibration supply conduit 14 and a calibration conduit 22 through a first calibration orifice 24. In some non-limiting examples, the valve 16 may be electrohydraulically actuated between the valve first and second positions.

A function control valve 26 can be connected to a function 28 (e.g., a hydraulic actuator or motor load) via one or more workports 30. The function control valve 26 may be configured to selectively provide fluid communication from the fluid source 12, or another fluid source separate from the fluid source 12, to the function 28 and from the function 28 to a tank (not shown). In addition to the one or more workports 30, the function control valve 26 can include at least additional two ports 32 and 34 that are isolated from the function 28 (i.e., isolated from the one or more workports 30). The function control valve 26 can be selectively moveable between at least two positions. In a function valve first position, the function control valve 26 can be configured to inhibit fluid communication between the at least two additional ports 32 and 34. In a function valve second position, the function control valve 26 can be configured to provide fluid communication between the at least two additional ports 32 and 34 to connect the calibration conduit 22 to a low pressure source 36 through a second calibration orifice 38. In some non-limiting examples, the function control valve 26 may be electrohydraulically actuated between the function valve first and second positions.

In some non-limiting examples, the low pressure source 36 may be a line connected to a tank or reservoir, or a line connected to a sump. In the illustrated non-limiting example, the first calibration orifice 24 may be a fixed orifice, and the second calibration orifice 38 may be a variable orifice. In some non-limiting examples, the first calibration orifice 24 may be a permanent orifice arranged on either the calibration supply conduit 14 or the calibration conduit 22 in series with and upstream of the second calibration orifice 38. In some non-limiting examples, the first calibration orifice 24 can be sized significantly smaller than the second calibration orifice 38. That is, a minimum restriction defined by the second calibration orifice 38 may be smaller than a restriction defined by the first calibration orifice 24. This can ensure that the pressure in the calibration supply conduit 14 remains generally constant while the calibration conduit 22 is connected to the low pressure source 36 via the second calibration orifice 38. A pressure sensor 40 may be arranged on the calibration conduit 22 downstream of the first calibration orifice 24 and upstream of the second calibration orifice 38.

As will be describe below, the calibration circuit 10 enables various calibrations of the function control valve 26 to be performed. For example, the series arrangement of the first calibration orifice 24 and the second calibration orifice 38 and the connection of the calibration conduit 22 to the low pressure source 36 enable the pressure sensor 40 to sense a pressure drop in the calibration conduit 22 once the connection is made between the calibration conduit 22 and the low pressure source 36 through the second calibration orifice 38. In this way, a calibration of the function control valve 26 position can be provided as a function of input command to the function control valve 26.

Figure 2:
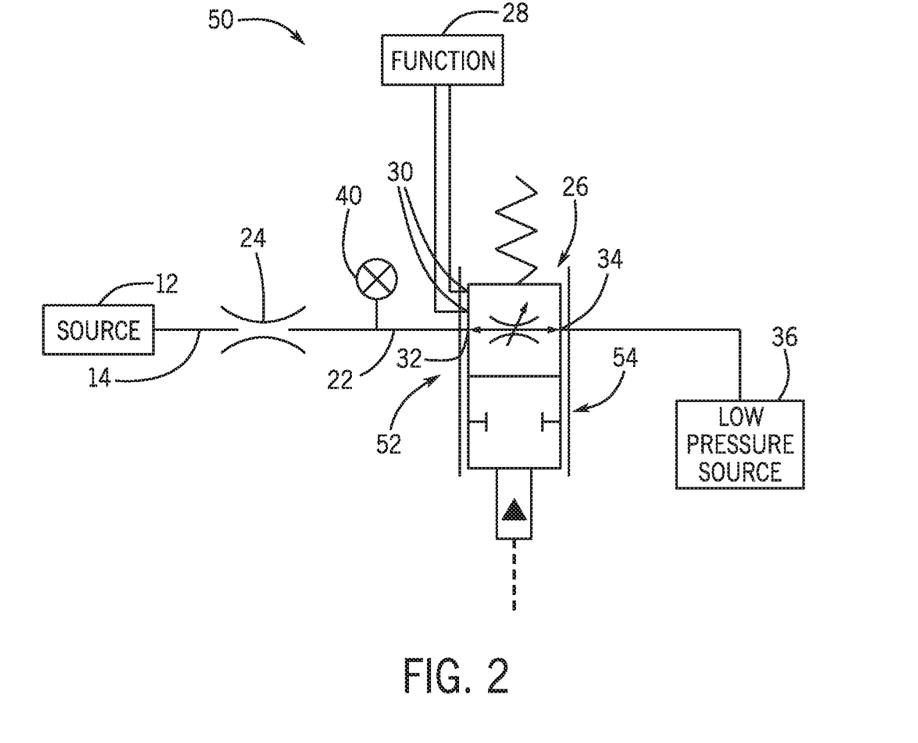
FIG. 2 is a schematic illustration of another calibration circuit operable to perform a calibration of an electrohydraulic valve according to one aspect of the present disclosure.

FIG. 2 illustrates another non-limiting example of a calibration circuit 50 according to one aspect of the present disclosure. The calibration circuit 50 of FIG. 2 can be similar to the calibration circuit 10 of FIG. 1, except as described below or is apparent from the figures. Like component are identified using similar reference numerals. As shown in FIG. 2, the bypass control valve 16 may not be required. Instead, the first calibration orifice 24 may be a permanent orifice arranged to provide fluid communication between the calibration supply conduit 14 and the calibration conduit 22. The electrohydraulic control valve 26 may be normally biased into a first position 52 where the function control valve 26 can be configured to provide fluid communication between the at least two additional ports 32 and 34 to connect the calibration conduit 22 to a low pressure source 36 through the second calibration orifice 38. In a second position 54, the function control valve 26 can be configured to inhibit fluid communication between the at least two additional ports 32 and 34. The calibration circuit 10 enables various calibrations of the function control valve 26 to be performed.

Figure 3:
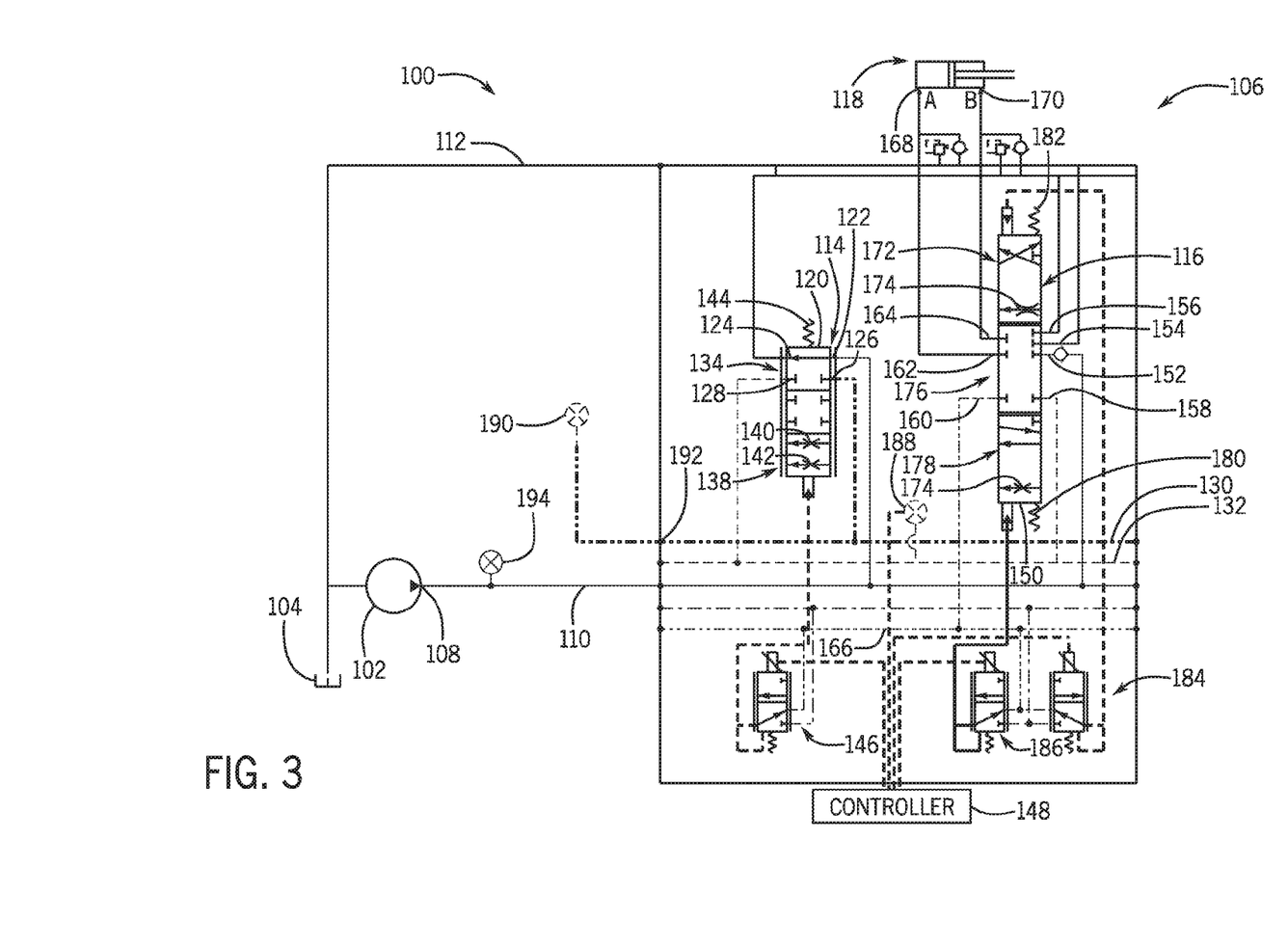
FIG. 3 is a schematic illustration of a hydraulic system operable to perform a calibration of an electrohydraulic valve according to one aspect of the present disclosure.

FIG. 3 illustrates one non-liming example of the calibration circuit 10 applied in a hydraulic system 100 according to one aspect of the present disclosure. The hydraulic system 100 can include a pump 102, a reservoir 104, and a control valve assembly 106. In the illustrated non-limiting example, the pump 102 can be a fixed displacement pump. In other non-limiting examples, the pump 102 may be a variable displacement pump.

The pump 102 can be configured to draw fluid, such as oil, from the reservoir 104 and furnish the fluid under increased pressure at a pump outlet 108. The pump outlet 108 can be in fluid communication with a supply conduit 110 that extends into and through the control valve assembly 106. A return conduit 112 can extend through the control valve assembly 106 and can be in fluid communication with the reservoir 104.

The control valve assembly 106 can include a bypass control valve 114 and a function control valve 116. The function control valve 116 can be configured to control a flow of fluid between a function 118 and the pump 102 and the reservoir 104. It should be appreciated that the number of functions and corresponding function control valves illustrated in the hydraulic system 100 is not meant to be limiting in any way and, in other non-limiting examples, the hydraulic system 100 may include more than one function 18 and a corresponding number of function control valves 116. The control valve assembly 106 may have a single monolithic body or comprise physically separate valve sections attached side by side.

The bypass control valve 114 may include a bypass spool 120 moveable between three positions. In other non-limiting examples, the bypass spool 120 may be moveable between more or less than three positions. The bypass control valve 114 can include a bypass inlet port 122, a bypass outlet port 124, a bypass calibration inlet port 126, and a bypass calibration outlet port 128. It should be appreciated that the number or ports on the bypass control valve 114 is not meant to be limiting in any way. In other non-limiting examples, the bypass control valve 114 may be designed to include more or less than two ports in addition to the bypass calibration inlet port 126 and the bypass calibration outlet port 128.

The bypass inlet port 122 can be in fluid communication with the supply conduit 110 and the bypass outlet port 124 can be in fluid communication with the return conduit 112. The bypass calibration inlet port 126 can be in fluid communication with a calibration supply conduit 130. The calibration supply conduit 130 can extend through the control valve assembly 106 and can be separate from the supply conduit 110. The bypass calibration outlet port 128 can be in fluid communication with a calibration conduit 132. The calibration conduit 132 can extend through the control valve assembly 106 and can be separate from the supply conduit 110.

In the illustrated non-limiting example, when the bypass spool 120 is in a first bypass position 134, fluid communication may be provided between the bypass inlet port 122 and the bypass outlet port 124, and fluid communication may be inhibited between the bypass calibration inlet port 126 and the bypass calibration outlet port 128. When the bypass spool 120 is actuated to a second bypass position 136, fluid communication may be inhibited between both the bypass inlet port 122 and the bypass outlet port 124, and the bypass calibration inlet port 126 and the bypass calibration outlet port 128. When the bypass spool 120 is actuated to a third bypass position 138, fluid communication may be provided between the bypass inlet port 122 and the bypass outlet port 124 through a bypass orifice 140, and fluid communication may be provided between the bypass calibration inlet port 126 and the bypass calibration outlet port 128 through a bypass calibration orifice 142. In some non-limiting examples, the bypass calibration orifice 142 may be a fixed orifice. It should be appreciated that the specific order of the bypass positions 134, 136, and 138 is not meant to be limiting in any way, and the bypass positions 134, 136, and 138 may be arranged on the bypass spool 120 in any order, as desired. In the illustrated non-limiting example, the connection between the bypass calibration inlet port 126 and the bypass calibration port 128 is independent of any other connections facilitated by the bypass control valve 114.

The bypass control valve 114 may be normally biased into the first bypass position 134 by a bypass spring 144. Actuation of the bypass control valve 114 may be electro-hydraulically controlled by a bypass pilot spool 146, which is in electrical communication with a controller 148. In operation, an electrical signal (e.g., a current) may be selectively applied to the bypass pilot spool 146 by the controller 148. In response to receiving the electrical signal from the controller 148, the bypass pilot spool 146 may provide a pilot signal to the bypass control valve 114, which, in turn, can actuate the bypass spool 120 from the first bypass position 134 toward the third bypass position 138 in proportion to a magnitude of the electrical signal. Thus, the magnitude of the electrical signal supplied by the controller 148 can proportionally correspond with an actuation position of the bypass spool 120 between the first bypass position 134 and the third bypass position 138. In other non-limiting examples, the bypass control valve 114 may be actuated via a solenoid in engagement with the bypass spool 120 instead of the bypass pilot spool 146.

The function control valve 116 may include a function spool 150 movable between three positions. In other non-limiting examples, the function spool 150 may include more or less than three positions. The function control valve 116 can include a function inlet port 152, a first function outlet port 154, a second function outlet port 156, a function calibration inlet port 158, a function calibration outlet port 160, a first workport 162, and a second workport 164. It should be appreciated that the number or ports on the function control valve 116 is not meant to be limiting in any way. In other non-limiting examples, the function control valve 116 may be designed to include more or less than five ports in addition to the function calibration inlet port 158 and the function calibration outlet port 160.

The function inlet port 152 can by in fluid communication with the supply conduit 110. Each of the first function outlet port 154 and the second function outlet port 156 can be in fluid communication with the return conduit 112. The function calibration inlet port 158 can be in fluid communication with the calibration conduit 132, and the function calibration outlet port 160 can be in fluid communication with a sump conduit 166. In other non-limiting examples, the function calibration outlet port 160 may be in fluid communication with the return conduit 112. As illustrated in FIG. 3, neither the function calibration inlet port 158 nor the function calibration outlet port 160 are connected to either of the first workport 162 or the second workport 164. Thus, any fluid flow between the function calibration inlet port 158 and the function calibration outlet port 160 may be isolated from the function 18.

The first workport 162 can be in fluid communication with a first function port 168 of the function 18, and the second workport 164 can be in fluid communication with a second function port 170 of the function 18. In the illustrated non-limiting example, the function 18 is a hydraulic actuator. In other non-limiting examples, the function 18 may be another implement required to be powered by fluid controlled by the function control valve 116 (e.g., a motor).

In the illustrated non-limiting example, when the function spool 150 is actuated to a first position 172, fluid communication can be provided between the function inlet port 152 and the second workport 164, and fluid communication can be provided between the first workport 162 and the second function outlet port 156. Also, in the first position 172, fluid communication can be provided between the function calibration inlet port 158 and the function calibration outlet port 160 through a function calibration orifice 174. When the function spool 150 is in a second position 176, fluid communication can be inhibited between any of the ports 152, 154, 156, 158, 160, 162, and 164. When the function spool 150 is actuated to a third position 178, fluid communication can be provided between the function inlet port 152 and the first workport 162, and fluid communication can be provided between the second workport 164 and the first function outlet port 154. Also, in the third position 178, fluid communication can be provided between the function calibration inlet port 158 and the function calibration outlet port 160 through the function calibration orifice 174. It should be appreciated that the function spool 150 may include two identical function calibration orifices 174 or, in some non-limiting examples, the function spool 150 may define different function calibration orifices 174 on different sides of a groove (or notches) on the function spool 150. However, the function calibration orifices 174 may operate similarly during calibration procedure regardless of their specific restriction characteristics.

In some non-limiting examples, the function calibration orifice 174 can be a variable orifice. A restriction provided by the bypass calibration orifice 142 can be sized significantly smaller than the restriction provided by the function calibration orifice 174. In addition, the bypass calibration orifice 142 and the function calibration orifice 174 may be arranged in series. In this way, when fluid communication is provided between the calibration supply conduit 130 and the calibration conduit 132 through the bypass calibration orifice 142, the pressure in the calibration supply conduit 130 can remain generally constant and the pressure in the calibration conduit 132 may drop when the calibration conduit 132 is connected to the sump conduit 166 through the function calibration orifice 174.

The function control valve 116 may be normally biased into the second position 176 by a first spring 180 and an opposing second spring 182. In other non-limiting examples, the function control valve 116 may be normally biased into the first position 172 or the third position 178. Actuation of the function control valve 116 may be electrohydraulically controlled by a first pilot spool 184 and a second pilot spool 186. The first pilot spool 184 and the second pilot spool 186 can be in electrical communication with the controller 148. In operation, an electrical signal (e.g., a current) may be selectively applied to one of the first pilot spool 184 or the second pilot spool 186 by the controller 148. If it is desired to move the function spool 150 toward the first position 172, the controller 148 may provide an electrical signal to the first pilot spool 184. In response, the first pilot spool 184 may provide a pilot signal to the function control valve 116, which, in turn, can actuate the function spool 150 toward the first position 172 in proportion to a magnitude of the electrical signal. Conversely, if it is desired to move the function spool 150 toward the third position 178, the controller 148 may provide an electrical signal to the second pilot spool 186. In response, the second pilot spool 186 may provide a pilot signal to the function control valve 116, which, in turn, can actuate the function spool 150 toward the third position 178 in proportion to a magnitude of the electrical signal. Thus, the magnitude of the electrical signal supplied by the controller 148 to the first pilot spool 184 or the second pilot spool 186 can proportionally correspond with an actuation position of the function spool 150 between the first position 172 or the third position 178. In other non-limiting examples, the function control valve 116 may be actuated via one or more solenoids in engagement with the function spool 150 instead of the first and second pilot spools 184 and 186.

A calibration pressure sensor 188 can be arranged on the calibration conduit 132 downstream of the bypass calibration orifice 142 and upstream of the function calibration orifice 174. In the illustrated non-limiting example, a calibration source 190 may be in fluid communication with an inlet 192 of the calibration supply conduit 130. The calibration source 190 may be in the form of a pump external from the pump 102. The calibration source 190 may be configured to selectively supply pressurized fluid (e.g., oil) into the calibration supply conduit 130. In other non-limiting examples, the hydraulic system 100 may not include the calibration source 190 and, instead, the pump 102 may be configured to selectively supply pressurized fluid to the calibration supply conduit 130. A pump pressure sensor 194 can be arranged on the supply conduit 110 downstream of the pump outlet 108 and upstream of the bypass inlet port 122. It should be appreciated that the pump pressure sensor 194 may not be required to perform the calibration methods described herein.

The hydraulic system 100 may be operable to perform a calibration of the function control valve 116 to remove the impact of component tolerances from the performance of the overall system. Specifically, as will be described below, the series connection of the bypass calibration orifice 142 and the function calibration orifice 174 along the calibration conduit 132 facilitates the calibration of the function control valve 116. However, it should be appreciated that the specific design of the components within the hydraulic system 100 is not meant to be limiting in any way. That is, the systems and methods for valve calibration described herein may be applied to any hydraulic system including one or more electrohydraulic valves connected to control fluid flow to a function.

Operation of the hydraulic system 100 when performing various calibration procedures will be described below with reference to FIGS. 2-4. It should be appreciated that the calibration systems and methods may also be applied to the calibration circuit 10 of FIG. 1, FIG. 2 or any other hydraulic system designed using the properties and techniques described herein. In some non-limiting examples, the controller 148 may be configured to provide instructions to the bypass control valve 114 and the function control valve 116, monitor the pressure acquired by the calibration pressure sensor 188, and/or perform the calibration calculation procedures described herein.

Figure 4:
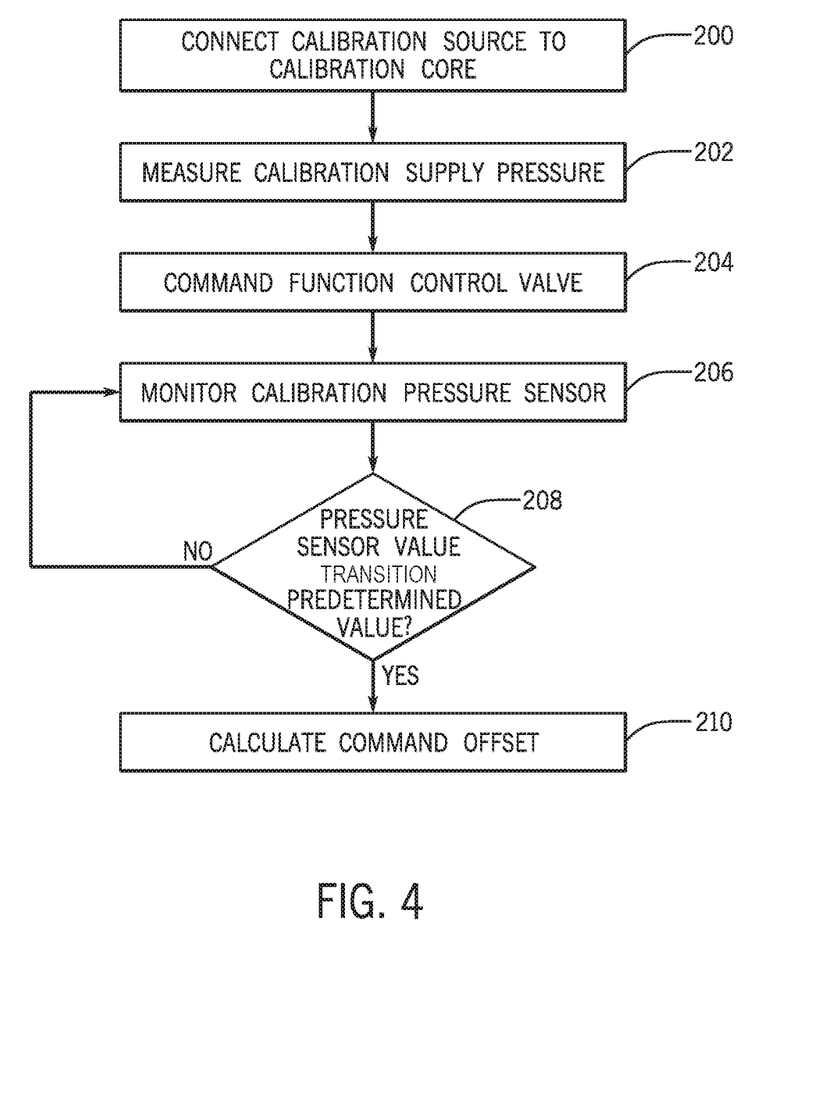
FIG. 4 is a flowchart outlining steps for performing an offset calibration for an electrohydraulic valve according to one aspect of the present disclosure.

FIG. 4 illustrates one non-limiting example of steps for performing an offset calibration for the function control valve 116 according to one aspect of the present disclosure. When the offset calibration is desired to initiate, the calibration source 190 may be connected to the calibration conduit 132 at step 200. This can be facilitated by instructing the bypass control valve 114 to actuate to the third bypass position 138. In the third bypass position 138, the bypass control valve 114 provides fluid communication from the calibration supply conduit 130 to the calibration conduit 132 through the bypass calibration orifice 142. As described above, in other non-limiting examples, the pump 102 may be configured to supply pressurized fluid into the calibration supply conduit 130 instead of the external calibration source 190.

With the calibration source 190 providing fluid flow into the calibration conduit 132 through the bypass calibration orifice 142, a calibration supply pressure can be measured at step 202. The calibration supply pressure can correspond with the pressure measured by the calibration pressure sensor 188 when no command is provided to the function control valve 116 (i.e., the function control valve 116 is in the second position 176 where fluid flow is inhibited from the calibration conduit 132 through the function control valve 116). The calibration supply pressure measured at step 202 may be used as a reference pressure during the calibration and, once acquired, it may be stored by the controller 148. Once the calibration supply pressure has been acquired, the function control valve 116 may be commanded (i.e., the controller 148 may apply an electrical signal that results in the function spool 150 position moving from the second position 176 toward the first position 172 or the third position 178) at step 204.

As the function control valve 116 is commanded at step 204, the calibration pressure sensor 188 may be monitored at step 206. In this way, the pressure in the calibration conduit 132 can be monitored as a function of the command (e.g., an electrical signal from the controller 148) supplied to the function control valve 116. As the function spool 150 position changes as the function control valve 116 is commanded, the connection between the calibration conduit 132 and the sump conduit 166 can be gradually provided through the function calibration orifice 174. The sump conduit 166 can be at a significantly lower pressure than the calibration conduit 132 and, thus, the pressure sensed by the calibration pressure sensor 188 can decrease as the function control valve 116 is commanded.

While the calibration pressure sensor 188 is monitoring the pressure in the calibration conduit 132, it can be determined at step 208 if the monitored pressure value in the calibration conduit 132 transitions a predetermined pressure value at step 202. For example, it can be determined at step 208 when the pressure in the calibration conduit 132 decreases to a predetermined ratio of the calibration supply pressure. The predetermined ratio can be defined to signify when the function control valve 116 has begun to "crack open" or when fluid flow is initiated therethrough. Alternatively or additionally, it can be determined when the pressure in the calibration conduit 132 transitions a known pressure, for example, a known pressure of the sump conduit 166. That is, the pressure in the calibration conduit 132 may be monitored by the calibration pressure sensor 188 and it can be determined when the monitored pressure transitions past a known pressure value (either from a pressure value below the known pressure value to a pressure value above the known value, or vice versa).

Electrohydraulic control valves may define a known, or predetermined, relationship between a restriction across the control valve and the command applied to the control valve. However, when the control valve is installed into a hydraulic system, the restriction as a function of command must be calibrated to account for variabilities and tolerances within the hydraulic system. Thus, finding or defining one known point on the restriction/pressure/position vs. command curve enables the rest of the curve to be defined and/or the x-intercept of the curve to be defined.

If it is determined at step 208 that the pressure in the calibration conduit 132 has transitioned the predetermined pressure value, then command value supplied to the function control valve 116 can be recorded at this transition point and a command offset can be calculated at step 210. The command offset calculated at step 210 may be calculated by comparing the recorded command value to a default command value that is supposed to correspond with the function control valve 116 beginning to provide fluid flow therethrough. Thus, the relationship between then command provided to the function control valve 116 and the corresponding position of the function spool 150 may be calibrated. Since the calibration circuit (i.e., the calibration supply conduit 130, the calibration conduit 132, the bypass calibration orifice 142, and the function calibration orifice 174) are isolated from the function 118, the offset calibration procedure may be safely initiated at any time during operation of the hydraulic system 100. Thus, the offset command for the function control valve 116 may be continually checked and corrected for.

Figure 5:
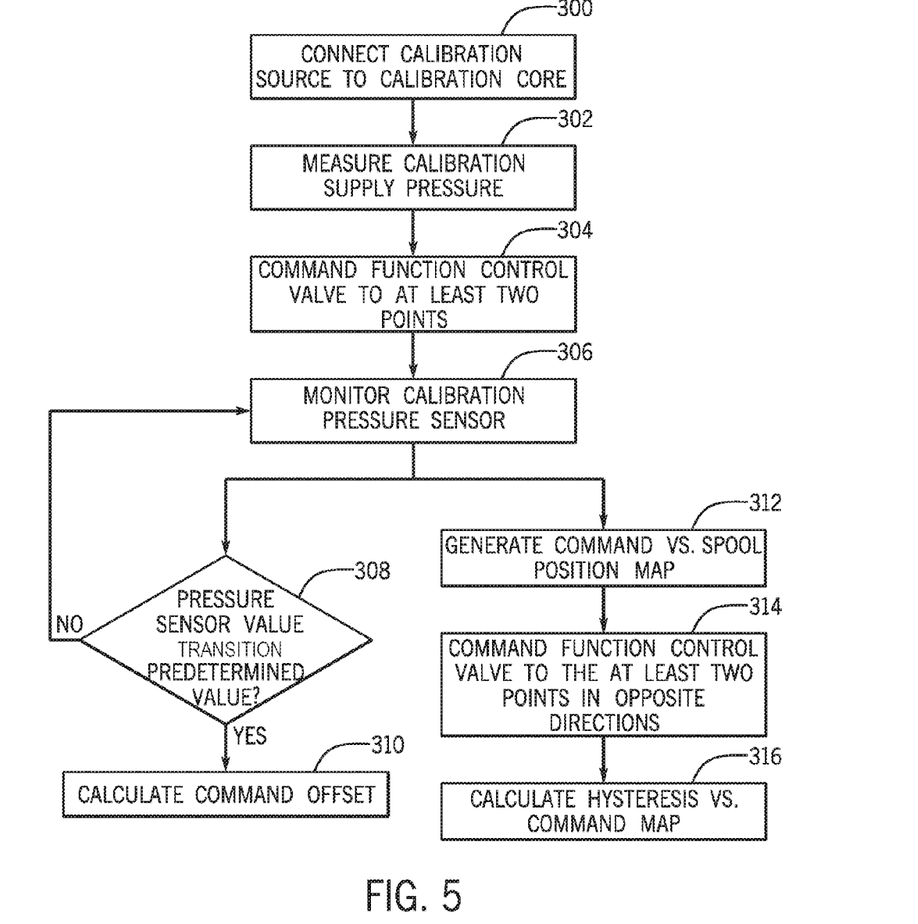
FIG. 5 is a flowchart outlining steps for performing various calibrations for an electrohydraulic valve according to one aspect of the present disclosure.

FIG. 5 illustrates one non-limiting example of steps for performing various calibration procedures for the function control valve 116 according to one aspect of the present disclosure. When the calibration procedure is desired to initiate, the calibration source 190 may be connected to the calibration conduit 132 at step 300. This can be facilitated by instructing the bypass control valve 114 to actuate to the third bypass position 138. In the third bypass position 138, the bypass control valve 114 provides fluid communication from the calibration supply conduit 130 to the calibration conduit 132 through the bypass calibration orifice 142. As described above, in other non-limiting examples, the pump 102 may be configured to supply pressurized fluid into the calibration supply conduit 130 instead of the external calibration source 190.

With the calibration source 190 providing fluid flow into the calibration conduit 132 through the bypass calibration orifice 142, a calibration supply pressure can be measured at step 302. The calibration supply pressure can be the pressure measured by the calibration pressure sensor 188 when no command is provided to the function control valve 116 (i.e., the function control valve 116 is in the second position 176 where is inhibited from the calibration conduit 132 through the function control valve 116). The calibration supply pressure measured at step 302 may be used as a reference pressure during the calibration and, once acquired, it may be stored by the controller 148. Once the calibration supply pressure has been acquired, a command to the function control valve 116 can be swept from a minimum value to a maximum value at step 304 (i.e., the controller 148 may sweep an electrical signal supplied to the function control valve 116 from a minimum value to a maximum value that results in the function spool 150 position moving from the second position 176 to the first position 172 or the third position 178). As the function spool 150 position changes as the function control valve 116 is commanded from the minimum value to the maximum value, the connection between the calibration conduit 132 and the sump conduit 166 can be gradually provided through the function calibration orifice 174. The sump conduit 166 can be at a significantly lower pressure than the calibration conduit 132 and, thus, the pressure sensed by the calibration pressure sensor 188 can decrease as the calibration conduit 132 is connected to the sump conduit 166.

As the function control valve 116 is commanded from a minimum to a maximum command at step 304, the pressure in the calibration conduit 132 may be monitored by the calibration pressure sensor 188 at step 306. In this way, the pressure in the calibration conduit 132 can be monitored as a function of the command (e.g., an electrical signal from the controller 148) supplied to the function control valve 116. Based on the monitored pressure in the calibration conduit 132, one or more calibration routines may be executed. For example, a command offset calibration may be calculated at steps 308 and 310. The command offset calibration calculated at steps 308 and 310 may be similar to the process described above with reference to steps 208 and 210 in FIG. 4.

Alternatively or additionally, a multipoint calibration map can be generated at step 312 based on the pressure in the calibration conduit 132 as the command to the function control valve 116 is swept from minimum to maximum. In some non-limiting examples, the multipoint calibration map may calibrate a relationship between the command to the function control valve 116 and the corresponding position of the function spool 150. To facilitate the generation of the multipoint calibration map, a restriction provided by the function calibration orifice 174 may define a known relationship to the position of the function spool 150. The relationship between the function calibration orifice 174 restriction and position of the function spool 150 may take any form (e.g., linear, exponential, parabolic, polynomial, etc.), as long as the relationship is known, or defined. The multipoint calibration map may be generated at step 312 using the known relationship between the restriction of the function calibration orifice 174 and the position of the function spool 150, and the pressure in the calibration conduit 132 measured by the calibration pressure sensor 188. For example, the pressure measured by the calibration pressure sensor 188 may be monitored to determined when the pressure in the calibration conduit 132 transitions to at least two different expected pressures based on the known characteristics of the function spool 150 as a function of command. The corresponding command values applied to the function control valve 116 that occurs when the at least two expected pressure values are transitions may be recorded. Based on the recorded command values that occur when the pressure in the calibration conduit 132 transitions the at least two expected pressure values, the predetermined characteristics of the function spool 150 may be compensated to calibrate the function control valve 116. That is, a multipoint calibration map may be generated for the function control valve 116. It should be appreciated that the function control valve 116 does not need to be commanded from a minimum command to a maximum command to facilitate generating a multipoint calibration map. The command value may be recorded when at least two different expected pressure values are transitioned. The at least two expected pressure values may occur at any point in the range of commands applied to the function control valve 116.

Sweeping the command to the function control valve 116 from a minimum value to an maximum value can alter the pressure in the calibration conduit 132 to enable the calibration offset to be calculated at step 310 and/or the multipoint calibration map to be generated at step 312. Additionally, a hysteresis of may be further calibrated by sweeping the command to the function control valve 116 from the maximum value back to the minimum value at step 314. Again, the known relationship between the restriction of the function calibration orifice 174 and the position of the function spool 150, and the pressure in the calibration conduit 132 measured by the calibration pressure sensor 188 may be used to generate another multipoint calibration map of the command to the function control valve 116 vs. a position of the function spool 150. The multipoint calibration map generated as the function control valve 116 was commanded from minimum to maximum may be compared to the multipoint calibration map generated as the function control valve 116 was commanded from maximum to minimum to calculate a hysteresis map as a function of command to the function control valve 116 at step 316. It should be appreciated that commanding the function control valve 116 from a minimum command to a maximum command and back to a minimum command is but one non-limiting example of generating hysteresis calibration data. In other non-limiting examples, the function control valve 116 may be commanded between a first command value and a second command value in a first direction and, subsequently commanded between the first command value and the second command value in a second direction opposite to the first direction. The command value when then monitored pressure in the calibration conduit 132 transitions a predetermined value may be recorded when the electrohydraulic control valve is commanded in the first direction and in the second direction. A hysteresis calibration may be calculated based on the recorded command values when the monitored pressure in the calibration conduit 132 transitions the predetermined pressure as the electrohydraulic control valve is commanded in the first direction and the second direction. The hysteresis calibration is the difference in command required to achieve the same valve position (as indicated by the monitored pressure in the calibration conduit 132).

It should be appreciated that one or more of the calibration procedures described with reference to FIG. 5 may be performed independently or simultaneously. In addition, the order in which the calibration procedures are illustrated in FIG. 5 is not meant to be limiting in any way. For example, in some non-limiting examples, the calibration pressure sensor 188 may continuously measure the pressure in the calibration conduit 132, and the function control valve 116 may be commanded from minimum to maximum and back to minimum. Then, based on the measured pressure in the calibration conduit 132, a calibration offset, a multipoint calibration map, and/or a hysteresis map may be calculated.

The systems and methods described herein provide various calibration procedures for an electrohydraulic valve. For example, an offset calculation for calibration of a function control valve command to spool position, a multipoint map for calibration of a function control valve command to spool position, and/or a hysteresis calibration as a function of command to a function control valve may be implemented. These calibration procedures can reduce variation in operation where a system calibration is required.

The use of a calibration conduit that is isolated from the main supply conduit and a function control orifice that is isolated from a function enable the calibration procedures described herein to be performed at a low pressure (i.e., a pressure substantially lower than the normal operating pressure). In some non-limiting examples, the pressure needed to perform the calibration procedures described herein may only be the pressure required to fully translate the function spool being calibrated. Additionally, the isolation of the calibration circuit from the main supply conduit and the function eliminate the requirement to move the function or have the system in a high energy state during calibration. This is advantageous for safe calibration for mobile machines in the field. The isolation of the calibration circuit further ensures that the functions and main supply conduit do not drain fluid into the calibration conduit. Further, the isolation of the calibration circuit from the main supply conduit and the function doesn't require that a function be attached to or in fluid communication with the electrohydraulic control valve being calibrated. This may, for example, enable the calibration procedures described herein to be performed during machine assembly, or for an auxiliary function without any attachments installed.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A calibration circuit operable to calibrate an electrohydraulic control valve in a hydraulic system, the hydraulic system including a pump configured to supply fluid into a supply conduit and at least one function, wherein the electrohydraulic control valve includes at least one workport in fluid communication with the at least one function, the calibration circuit comprising:
 a calibration conduit isolated from the supply conduit;
 a first calibration orifice configured to provide fluid communication between the calibration conduit and a fluid source;
 a second calibration orifice arranged in series with the first calibration orifice; wherein the second calibration orifice is on a spool of the electrohydraulic control valve and is configured to selectively provide fluid communication between the calibration conduit and a tank; and
 a pressure sensor configured to measure a pressure in the calibration conduit between the first calibration orifice and the second calibration orifice,
 wherein the second calibration orifice is isolated from the at least one workport of the electrohydraulic control valve.

2. The calibration circuit of claim 1, further comprising a calibration supply conduit configured to receive a flow of fluid from the fluid source.

3. The calibration circuit of claim 2, wherein the fluid source is external from the pump.

4. The calibration circuit of claim 2, wherein the fluid source is the pump.

5. The calibration circuit of claim 1, wherein the first calibration orifice is a fixed orifice.

6. The calibration circuit of claim 1, wherein the first calibration orifice is configured to selectively provide fluid communication between the calibration conduit and the fluid source.

7. The calibration circuit of claim 1, wherein the second calibration orifice is a variable orifice.

8. The calibration circuit of claim 1, wherein a minimum restriction defined by the second calibration orifice is smaller than a restriction defined by the first calibration orifice.

9. The calibration circuit of claim 1, further comprising a bypass control valve selectively movable between a first position where fluid communication is inhibited between the calibration supply conduit and the calibration conduit, and a second position where fluid communication is provided between the calibration supply conduit and the calibration conduit.

10. The calibration circuit of claim 9, wherein the first calibration orifice is arranged on a spool of the bypass control valve.

11. The calibration circuit of claim 10, wherein a connection through the first calibration orifice in the bypass control valve is isolated from other connections made thereby.

12. The calibration circuit of claim 1, further comprising a controller in electrical communication with the pressure sensor and the electrohydraulic control valve.

13. The calibration circuit of claim 12, wherein the controller is operable to:
 monitor a pressure in the calibration conduit;
 command the electrohydraulic control valve to provide fluid communication from the calibration conduit to the tank through the second calibration orifice;
 determine when the pressure in the calibration conduit transitions to a predetermined pressure value;
 record the command applied to the electrohydraulic control valve when the pressure in the calibration conduit transitions the predetermined pressure value; and
 calibrate a position of the electrohydraulic control valve to the command applied thereto.

14. A hydraulic system operable to calibrate an electrohydraulic control valve, the hydraulic system comprising:
 a pump configured to supply fluid into a supply conduit;
 at least one function;
 an electrohydraulic control valve having at least one workport in fluid communication with the at least one function;
 a calibration supply conduit configured to receive a flow of fluid from a calibration source;
 a calibration conduit;
 a first calibration orifice configured to provide fluid communication between the calibration supply conduit and the calibration conduit;
 a second calibration orifice arranged in series with the first calibration orifice; wherein the second calibration orifice is on a spool of the electrohydraulic valve and is configured to selectively provide fluid communication between the calibration conduit and a tank; and
 a pressure sensor configured to measure a pressure in the calibration conduit between the first calibration orifice and the second calibration orifice,
 wherein the calibration conduit and the second calibration orifice are isolated from the at least one function.

15. The hydraulic system of claim 14, further comprising a bypass control valve selectively movable between a first position where fluid communication is inhibited between the calibration supply conduit and the calibration conduit, and a second position where fluid communication is provided between the calibration supply conduit and the calibration conduit.

16. The calibration circuit of claim 15, wherein the first calibration orifice is arranged on a spool of the bypass control valve.

17. The calibration circuit of claim 16, wherein a connection through the first calibration orifice in the bypass control valve is isolated from other connections made thereby.

18. The hydraulic system of claim 14, further comprising a controller in electrical communication with the pressure sensor and the electrohydraulic control valve.

19. The hydraulic system of claim 18, wherein the controller is operable to:
 monitor a pressure in the calibration conduit;
 command the electrohydraulic control valve to provide fluid communication from the calibration conduit to the tank through the second calibration orifice;
 determine when the pressure in the calibration conduit transitions to a predetermined pressure value;
 record the command applied to the electrohydraulic control valve when the pressure in the calibration conduit transitions the predetermined pressure value; and
 calibrate a position of the electrohydraulic control valve to the command applied thereto.

20. A method for calibrating an electrohydraulic control valve in a hydraulic system, the hydraulic system including a pump configured to supply fluid into a supply conduit and at least one function, wherein the electrohydraulic control valve includes at least one workport in fluid communication with the at least one function, the method comprising:
 providing a flow of fluid into a calibration conduit through a first calibration orifice, wherein the calibration conduit is isolated from the supply conduit;

commanding the electrohydraulic control valve to provide fluid communication from the calibration conduit to a tank through a second calibration orifice, wherein the second calibration orifice is arranged on a spool of the electrohydraulic control valve and isolated from the at least one function;

monitoring a pressure in the calibration conduit as the electrohydraulic control valve is commanded;

determining when the pressure in the calibration conduit transitions to a predetermined pressure value;

recording the command applied to the electrohydraulic control valve when the pressure in the calibration conduit transitions the predetermined pressure value; and calibrating a position of the electrohydraulic control valve to the command applied thereto.

21. The method of claim 20, wherein calibrating a position of the electrohydraulic control valve to the command applied thereto comprises:

comparing the recorded command to a predetermined command and calculating a command offset based on the difference between the recorded command and the predetermined command.

22. The method of claim 20, further comprising:

recording at least two commands applied to the electrohydraulic valve when the pressure in the calibration conduit transitions to at least two expected pressure values, wherein the at least two expected pressure are based on predetermined characteristics of the electrohydraulic control valve;

generating a multipoint calibration map that correlates a position of the electrohydraulic valve with any command applied thereto.

23. The method of claim 20, further comprising:

commanding the electrohydraulic control valve between a first command value and a second command value in in a first direction and commanding the electrohydraulic control valve between the first command value and the second command value in a second direction opposite to the first direction.

24. The method of claim 23, further comprising:

recording a first measured command value when then monitored pressure in the calibration conduit transitions to the predetermined pressure value when the electrohydraulic control valve is commanded in the first direction and recording a second measured command value when the monitored pressure in the calibration conduit transitions to the predetermined pressure value when the electrohydraulic control-valve is commanded in the second direction.

25. The method of claim 24, further comprising:

calculating a hysteresis calibration based on the recorded first and second measured command values when the monitored pressure in the calibration conduit transitions to the predetermined pressure value as the electrohydraulic control valve is commanded in the first direction and the second direction.

* * * * *

UNITED STATES PATENT AND TRADEMARK OFFICE
CERTIFICATE OF CORRECTION

PATENT NO. : 10,443,758 B2
APPLICATION NO. : 15/452261
DATED : October 15, 2019
INVENTOR(S) : Tim Dolan Page 1 of 1

It is certified that error appears in the above-identified patent and that said Letters Patent is hereby corrected as shown below:

In the Claims

Column 16, Claim 25, Lines 23-24, "the recorded first" should be --the first--.

Signed and Sealed this
Nineteenth Day of November, 2019

Andrei Iancu
*Director of the United States Patent and Trademark Office*